United States Patent [19]

Lawrence

[11] Patent Number: 5,659,964
[45] Date of Patent: Aug. 26, 1997

[54] LIGHT WEIGHT ROTARY VEGETATION CUTTING HEADS

[76] Inventor: Elbert Lawrence, 202 River Oaks Dr., West Monroe, La. 71291

[21] Appl. No.: 582,158

[22] Filed: Jan. 2, 1996

Related U.S. Application Data

[63] Continuation-in-part of Ser. No. 354,244, Dec. 12, 1994, Pat. No. 5,493,785.

[51] Int. Cl.$^6$ .................................................. B26B 9/60
[52] U.S. Cl. ............................................ 30/347; 30/276
[58] Field of Search ................. 30/276, 347; 56/12.7, 56/295

[56] References Cited

U.S. PATENT DOCUMENTS 4,345,420  8/1982  Oosterling et al. .
4,406,065  9/1983  Kohler ................................... 30/347
5,430,943  7/1995  Lee ................................... 30/276 X

FOREIGN PATENT DOCUMENTS 2756940  6/1979  Germany ................................... 30/276

*Primary Examiner*—Douglas D. Watts
*Attorney, Agent, or Firm*—Laurence R. Brown

[57] ABSTRACT

A cutting head member for a vegetation trimmer such as a lawn edger or hedge trimmer has a rotatable blade holding jig journalled between two disc-like members clamped by a bolt onto a rotary shaft drive mechanism. The rotatable blade in one embodiment comprises a quick change removably mounted nail. The preferred embodiments provide an option of mounting either a rigid steel cutting blade or a string cutting blade.

6 Claims, 2 Drawing Sheets

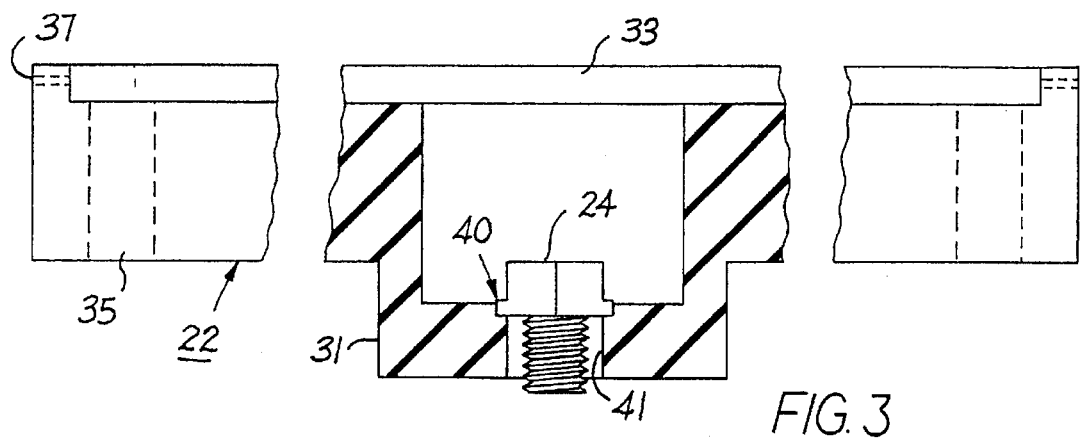
FIG. 3
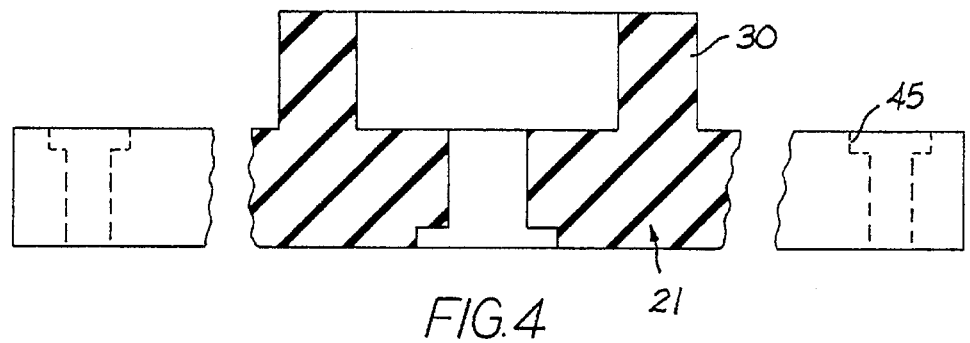
FIG. 4
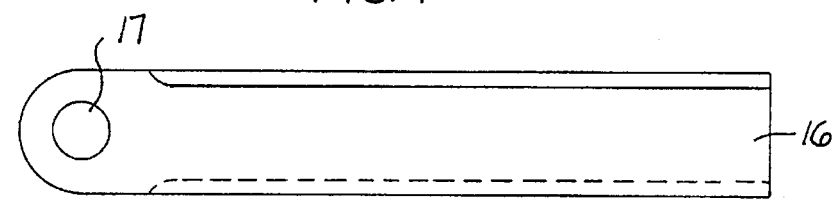
FIG. 5
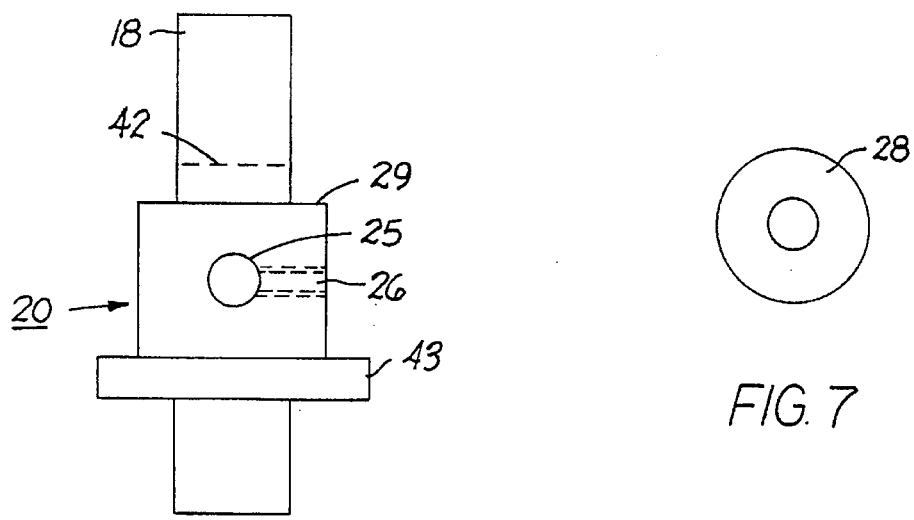
FIG. 6
FIG. 7

LIGHT WEIGHT ROTARY VEGETATION CUTTING HEADS

This is a continuation-in-part of my application Ser. No. 08/354,244 filed Dec. 12, 1994 for Heavy-Duty-, Long-Life, Light-Weight, High-Speed Rotary Grass Cutting Head, now U.S. Pat. No. 5,493,785, issued Feb. 27, 1996.

TECHNICAL FIELD

This invention relates to rotary vegetation mowers and more specifically it relates to rotary cutting heads for edgers, mowers, hedge clippers, and the like.

BACKGROUND ART

The disclosure of my U.S. Pat. No. 5,493,785, issued Feb. 27, 1996, is included herein in its entirety by reference.

Rotary vegetation mowers using both string and rigid steel blades are well known in the art including those that use a replaceable nail as a cutting blade.

A significant problem in the prior art for edgers or hedge trimmers that are manually portable is the heavy weight and high power requirements for accomplishing such functions as the cutting of hedges where a cutter can encounter stalks too tough to routinely cut.

A general problem is that rotary mowers are not usually adaptable to different kinds of vegetation cutting challenges. Thus tender newly sprouted grass cutting requires drastically different conditions than mature wiry strains of grass, and weeds that may need to be cut as well.

A more specific problem is that a rigid rotary cutting blade may snap or cause catastrophic failure if it hits a foreign object such as a rock, wire or tree root in the course of mowing. That has been addressed in part in the prior art by providing rotary mounts for the cutting blades. Thus, an encounter with a foreign object when mowing will usually permit the blade to recover. An example of such a mowing implement is U.S. Pat. No. 4,345,420 issued to P. A. Oesterling, et al. Aug. 24, 1982 which rotatably mounts a cutter blade upon a peg rigidly mounted near the periphery of and between two separated rotatable discs.

However, such mechanisms generally improperly distribute weight toward the outer cutting periphery which will slow down the rotation speed and require additional mowing power.

Also such mechanisms are not adaptable to a wide range of mowing conditions. For example blades are not designed to cut over a range of grass lawns when weeds are encountered, brush and other vegetation forms. It would be most unusual to have rotary cutting heads that are adaptable to a wide range of conditions including hedge cutters that encounter woody branches.

Accordingly it is an object of this invention to improve the state of the rotary mower art with a novel versatile, light-weight, multiple-use cutting head.

DISCLOSURE OF THE INVENTION

A versatile multi-functional rotary vegetation cutter head suitable for mowers, edgers and hedge trimmers provides for use of either string or metal cutting blades of two varieties. One of the metal cutting blades is an easily replaceable nail that is secured by a set screw into a hole through a rotatable jig that permits the nail to rotate should it encounter a load such as a heavy branch or wire that would tend to break or stall the mower mechanism. The nails are replaceable when worn without mechanical disassembly of the head hardware.

Alternative blades operable with the cutting head include both a steel knife sharpened on opposite sides for longer life and a string threaded through appropriate retention apertures. Thus, the cutter head is operable with a cord for tender grass, or with the metal blade for encountering wiry grass, weeds, brush and even for use as a hedge trimmer. The head may be used either portably on a hand held wand in the customary manner of edgers or with a wheeled mower housing.

The construction of critical cutter head parts from Ultra High Molecular Weight Polyethylene (UHMW) provides higher speed, lighter weight head with high mechanical strength and long life. Two basic cutter head parts, comprising rotatable discs or the like, are nested and spaced apart at the outer edge for receiving therebetween a set of the metallic knife wielding rotatable jigs, which can be removed to lighten the head and run at higher speed when the cord or string cutting blades are used.

Other objects, features and advantages of the invention will be found throughout the following description, and the accompanying drawings.

BRIEF DESCRIPTION OF THE DRAWINGS:

In the accompanying drawings, wherein like reference characters are used throughout the various views to indicate similar features:

FIG. 3 is an elevation view partly in section of an outer cutter head disc member;

FIG. 4 is an elevation view partly in section of an inner cutter head disc member;

FIG. 5 is a plan view of a metallic cutting blade for carrying on the cutter head in one configuration;

FIG. 6 is an enlarged elevation view of the rotary jig assembly for holding metallic blades; and FIG. 7 is a plan view of a washer that fits about the rotary jig body when the metallic blade of FIG. 6 is not in use.

THE PREFERRED EMBODIMENTS

Figure 1:
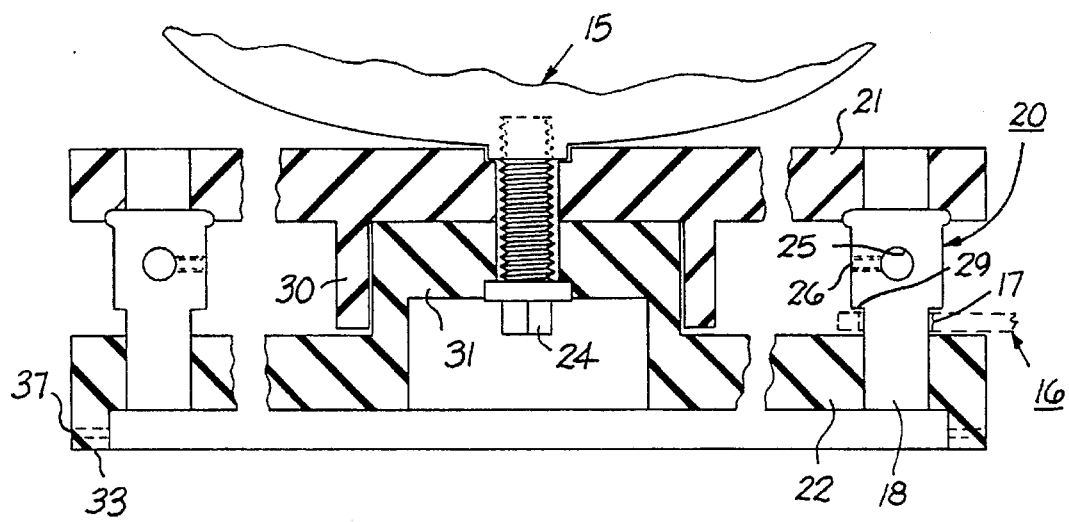
FIG. 1 is an elevation view partly in section of a cutter head assembly having two nestled disc members mounted upon a rotable drive member.

Now the preferred embodiments of the invention are discussed in more detail with reference to the accompanying drawings. In FIG. 1, the rotary member 15 represents a drive mechanism, such as found on a hand held lawn edger or a wheel supported rotary mower, with engine and housing not shown. The drive member 15 typically has some weight to provide flywheel effect drive inertia for carrying the cutting head stably through loaded and unloaded conditions without significant changes of speed.

Shown in phantom is the metallic cutting blade 16 of FIG. 6 that may be turned over in place when one sharpened blade edge becomes dull. It preferably has a length of about five inches so that it can be used to trim hedges, for example, or various types of rough brush or weeds. The mounting aperture 17 for blade 16 is rotatably mounted about the spindle 18 of the rotatable jig 20, which in turn is journalled at opposing ends of its vertical shaft between the outer edges of the respective plastic body head members 21, 22 for freely rotating therein. The jig 20 may be either plastic or metallic, but plastic is preferred for lighter weight and the UHMW polyethylene is strong enough to have long life for this purpose also.

Thus in operation, should the blade 16, in cutting a hedge for example, encounter a branch too large for cutting, the blade can rotate with put stalling the engine or breaking off the blade. In normal cutting posture the blade is extended radially from the drive shaft bolt 24 by centrifugal force due to the high speed rotation of the cutter head, and thus will cut through normal load stalks by impact without rotation on the jig spindle 18.

The aperture 25 and set screw 26 in the jig body is for alternatively using an ordinary headed nail as a cutting blade, and has a diameter for snugly receiving a designated nail size to be clamped into place. Likewise the nail will extend beyond the peripheral edge of the cutting members 21, 22 by centrifugal force even though the jig 20 freely rotates in place, but can rotate if it encounters a foreign object that is not cut in two by normal impact, such as a wire or stone. When the nail is used, the plastic washer 28 of FIG. 7 replaces the cutting knife 16 to rest against spindle shoulder 29. The jig member 20 is also seen in the separate view of FIG. 6.

The mounting bolt 24, which in this embodiment constitutes the rotating shaft drive member, tightly clamps the cutting head disc members 21, 22 to the drive member 15 for rotation in response to the power system, not shown. Preferably the two disc members are nested together in the generally cup and saucer configuration shown with the flanges 30, receiving the mating cylindrical extension 31.

Figure 2:
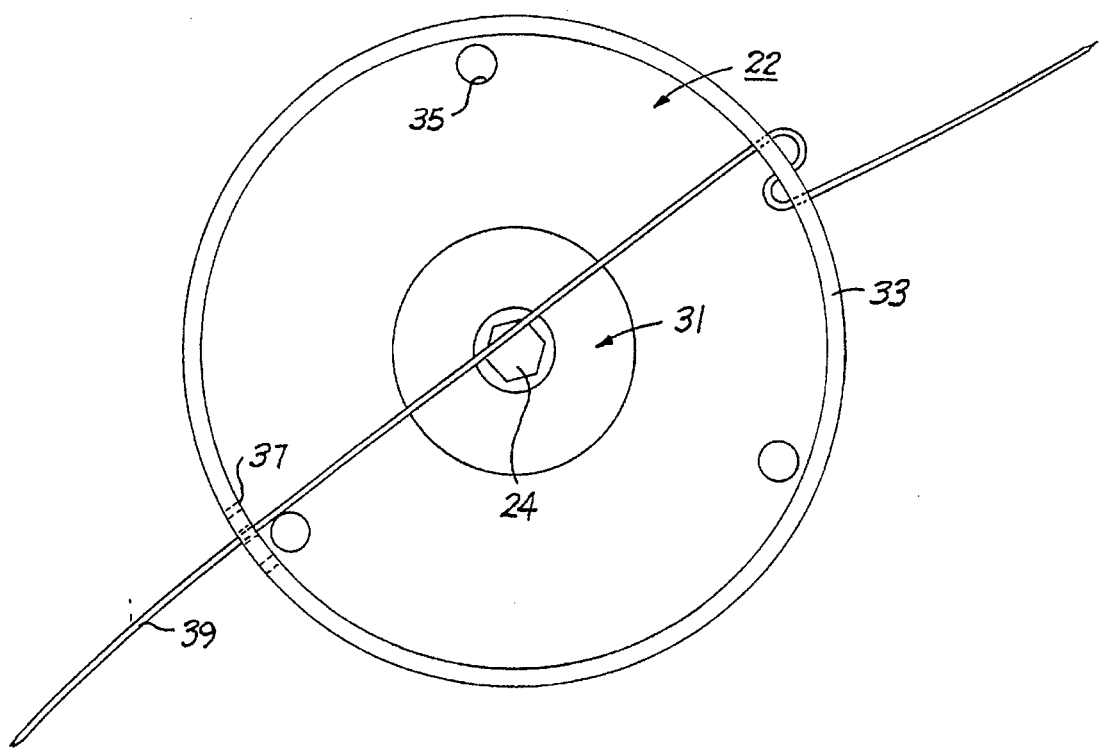
FIG. 2 is a plan view sketch of an outer cutter head element with a string cutter blade installed.

As may be seen from FIG. 2, the outer disc 22 is flanged about the outer periphery at 33, and has typically three axially directed apertures 35 for receiving the rotatable jig 20 spindles. The flanges are apertured, as also seen in FIG. 1, typically with three spaces apertures 37 in two respective diametrically opposed locations. Thus the string 39, typically plastic, can be threaded through for another alternative cutter blade used in the conventional manner for edging of a lawn, for example.

In retrospect therefore it may be seen that this construction is simple and comprehensive in serving cutting head functions. It is particularly useful when weeds or other heavy stalks or brush is to be cut and for hedge clipping. The use of nails and string with changing after wear is possible without disassembling the two disc members 21, 22 by removal of the single bolt 24. The light weight hard wearing plastic construction with a material that is compatible with metal to plastic interfacing without significant wear is a feature that permits higher rotating and cutting speeds.

The two plastic cutting head disc members 21, 22 are shown respectively disassembled in FIGS. 3 and 4. It is noted in disc member 22 that the bolt head 24 is nested in the indented ring 40 about the shaft hole 41 serving to center the array when the flanges 30 encompass the cup cylinder 31. Conversely the shoulder 43 of the jig 20 is journalled in the ring 45 of disc member 21 which permits rotation as the opposite jig shoulder 29 abuts the washer 28 or blade 16 at the opposite spindle each being of the thickness indicated by dotted line 42 in FIG. 6

Having therefore introduced an improved vegetation cutting head with-advantageous features, those novel features setting forth the spirit and nature of the invention are defined with particularity in the following claims.

I claim:

1. A rotary vegetation cutting head comprising in combination, two rotatable head pieces having mounting members for mounting in registration on a rotatable shaft and shaped with spaced apart peripheral surfaces extending radially a predetermined distance from the shaft and having peripheral structure for receiving and mounting cutting members that extend beyond the respective head piece peripheries, a set of axially disposed rotatable jigs with cylindrical ends adapted to hold at least one cutting member for mounting between the head pieces at said peripheral surfaces substantially parallel to the shaft, a plurality of jig receiving aperture journals in the peripheral surfaces of both head pieces aligned to journal thereinto the cylindrical ends of said rotatable jigs, and further comprising, substantially disc shaped head pieces nested together in a cup and saucer joint about the shaft.

2. The cutting head defined in claim 1 wherein the head pieces are made of ultra high molecular weight polyethylene.

3. A rotary vegetation cutting head comprising in combination, two rotatable head pieces having mounting members for mounting in registration on a rotatable shaft and shaped with spaced apart peripheral surfaces extending radially a predetermined distance from the shaft and having peripheral structure for receiving and mounting cutting members that extend beyond the respective head piece peripheries, a set of axially disposed rotatable jigs with cylindrical ends adapted to hold at least one cutting member for mounting between the head pieces at said peripheral surfaces substantially parallel to the shaft, a plurality of jig receiving aperture journals in the peripheral surfaces of both head pieces aligned to journal thereinto the cylindrical ends of said rotatable jigs, and wherein the jigs have a lateral aperture adapted to receive a nail and a locking member for holding the nail in place as a cutting member.

4. A rotary vegetation cutting head comprising in combination, two rotatable head pieces having mounting members for mounting in registration on a rotatable shaft and shaped with spaced apart peripheral surfaces extending radially a predetermined distance from the shaft and having peripheral structure for receiving and mounting cutting members that extend beyond the respective head piece peripheries, a set of axially disposed rotatable jigs with cylindrical ends adapted to hold at least one cutting member for mounting between the head pieces at said peripheral surfaces substantially parallel to the shaft, a plurality of jig receiving aperture journals in the peripheral surfaces of both head pieces aligned to journal thereinto the cylindrical ends of said rotatable jigs, and further comprising a steel blade cutting member with a mounting aperture at one end thereof and a receptacle slot in said jig for receiving the blade rotatably therein.

5. The cutting head of claim 4 wherein said steel blade has two sharpened sides and is reversably mountable on the jig to cut vegetation with one of the two sharpened sides.

6. A rotary vegetation cutting head comprising in combination, two rotatable head pieces having mounting members for mounting in registration on a rotatable shaft and shaped with spaced apart peripheral surfaces extending radially a predetermined distance from the shaft and having peripheral structure for receiving and mounting cutting members that extend beyond the respective head piece peripheries, a set of axially disposed rotatable jigs with cylindrical ends adapted to hold at least one cutting member for mounting between the head pieces at said peripheral surfaces substantially parallel to the shaft, a plurality of jig receiving aperture journals in the peripheral surfaces of both head pieces aligned to journal thereinto the cylindrical ends of said rotatable jigs, and further comprising flanges extending parallel to the shaft about the periphery of an outermost headpiece and apertures therethrough for retaining a length of vegetation cutting cord with two ends extending peripherally beyond that head piece.

* * * * *